United States Patent
Wood et al.

(10) Patent No.: US 11,377,072 B2
(45) Date of Patent: Jul. 5, 2022

(54) SYSTEMS AND METHODS FOR TAMPER EVIDENT ELECTRONIC DETECTION

(71) Applicant: UATC, LLC, San Francisco, CA (US)

(72) Inventors: Matthew Charles Ellis Wood, Pittsburgh, PA (US); Jason Scott McMullan, Pittsburgh, PA (US); Matthew James Harris, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 709 days.

(21) Appl. No.: 16/199,832

(22) Filed: Nov. 26, 2018

(65) Prior Publication Data

US 2020/0139932 A1  May 7, 2020

Related U.S. Application Data

(60) Provisional application No. 62/754,950, filed on Nov. 2, 2018.

(51) Int. Cl.
*B60R 25/01* (2013.01)
*B60R 25/24* (2013.01)
*B60R 25/30* (2013.01)
*H04L 9/08* (2006.01)
(Continued)

(52) U.S. Cl.
CPC ............. *B60R 25/30* (2013.01); *B60R 25/01* (2013.01); *B60R 25/24* (2013.01); *G05D 1/0088* (2013.01);
(Continued)

(58) Field of Classification Search
CPC ......... B60R 25/01; B60R 25/24; B60R 25/30; B60R 2325/108; G05D 1/0088;
(Continued)

(56) References Cited

U.S. PATENT DOCUMENTS 8,315,760 B2 * 11/2012 Costantino ........ G06F 16/24573
701/34.2
8,868,913 B1 * 10/2014 Watsen ............... H04L 63/0823
709/227

(Continued)

FOREIGN PATENT DOCUMENTS

CN   112118240   * 12/2020 ........... H04L 63/083
CN   112632570   *  4/2021 ........... H04L 67/141
(Continued)

*Primary Examiner* — Joshua E Rodden
(74) *Attorney, Agent, or Firm* — Dority & Manning, P.A.

(57) ABSTRACT

Systems and methods are directed to detecting tampering with a secured area of an autonomous vehicle. In one example, a computing system performs operations including generating a first key pair comprising a first private key and a first public key as part of a vehicle registration process; providing the first public key to one or more remote computing systems; determining whether a reset event occurred at a vehicle; in response to determining that the reset event occurred, discarding the first key pair and generating a second key pair comprising a second private key and a second public key; receiving a status query from one of the one or more remote computing systems; generating a response to the status query, the response being signed using either the first private key or the second private key; and providing the response to the one of the one or more remote computing systems.

20 Claims, 7 Drawing Sheets

(51) Int. Cl.
  *H04L 9/32* (2006.01)
  *G05D 1/00* (2006.01)
  *H04W 12/03* (2021.01)
(52) U.S. Cl.
  CPC .......... *H04L 9/0861* (2013.01); *H04L 9/0891* (2013.01); *H04L 9/3263* (2013.01); *H04W 12/03* (2021.01); *B60R 2325/108* (2013.01); *G05D 2201/0213* (2013.01)
(58) Field of Classification Search
  CPC .......... G05D 2201/0213; H04L 9/0861; H04L 9/0891; H04L 9/3263; H04W 12/03
  USPC .......................................................... 701/23
  See application file for complete search history.

(56) References Cited

U.S. PATENT DOCUMENTS

| | | | |
|---|---|---|---|
| 9,508,199 B2 * | 11/2016 | Bai | H04M 1/6091 |
| 9,778,653 B1 * | 10/2017 | McClintock | B67D 7/348 |
| 10,211,977 B1 * | 2/2019 | Roth | H04L 9/0897 |
| 10,222,228 B1 * | 3/2019 | Chan | B60W 40/09 |
| 10,486,708 B1 * | 11/2019 | Chan | B60W 60/001 |
| 11,112,418 B1 * | 9/2021 | Holmes | G01N 35/00069 |
| 2009/0086977 A1 * | 4/2009 | Berggren | H04L 9/0819 380/279 |
| 2017/0305368 A1 * | 10/2017 | Markham | B60R 16/0231 |
| 2018/0063711 A1 * | 3/2018 | Rivera | H04W 12/069 |
| 2020/0139932 A1 * | 5/2020 | Wood | H04L 9/0897 |
| 2021/0344690 A1 * | 11/2021 | Sharifi Mehr | H04L 63/145 |
| 2022/0046114 A1 * | 2/2022 | Entelis | H04L 12/40 |

FOREIGN PATENT DOCUMENTS

| | | | | |
|---|---|---|---|---|
| KR | 102318112 | * | 10/2021 | ......... G06Q 20/3829 |
| KR | 102321689 | * | 11/2021 | ............... H04W 4/40 |
| WO | WO-2014174491 A1 | * | 10/2014 | ........... G06F 16/951 |
| WO | WO-2014191179 A1 | * | 12/2014 | ......... H04L 63/0209 |
| WO | WO-2019043446 A1 | * | 3/2019 | ........... G05D 1/0287 |

* cited by examiner

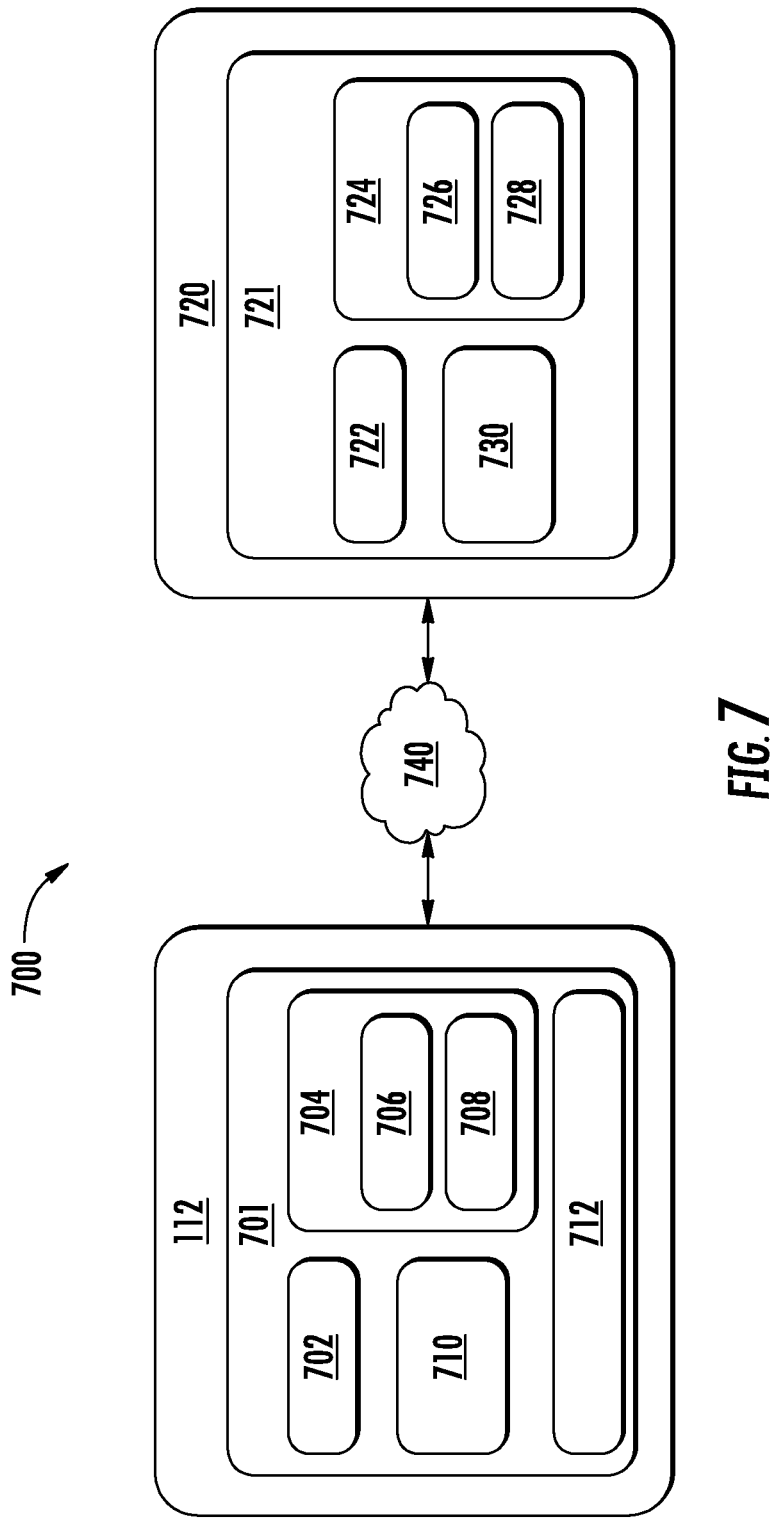

SYSTEMS AND METHODS FOR TAMPER EVIDENT ELECTRONIC DETECTION

PRIORITY CLAIM

The present application is based on and claims the benefit of U.S. Provisional Application 62/754,950 having a filing date of Nov. 2, 2018, which is hereby incorporated by reference herein in its entirety for all purposes.

FIELD

The present disclosure relates generally to operation of an autonomous vehicle. More particularly, the present disclosure relates to systems and methods that provide for detection of access and/or tampering associated with a secured area of an autonomous vehicle.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors; and one or more memories including instructions that, when executed by the one or more processors, cause the one or more processors to perform operations. The operations include generating, as a current key pair, a first key pair including a first private key and a first public key as part of a vehicle registration process. The operations further include providing the first public key to one or more remote computing systems. The operations further include determining whether a reset event occurred at a vehicle. The operations further include, in response to determining that the reset event occurred, discarding the first key pair as the current key pair and generating a second key pair including a second private key and a second public key as the current key pair. The operations further include receiving a status query from one of the one or more remote computing systems. The operations further include generating a response to the status query, the response being signed using either the first private key or the second private key. The operations further include providing the response to the one of the one or more remote computing systems.

Another example aspect of the present disclosure is directed to an autonomous vehicle. The autonomous vehicle includes a vehicle computing system. The vehicle computing system includes one or more processors; and one or more memories including instructions that, when executed by the one or more processors, cause the one or more processors to perform operations. The operations include generating, as a current key pair, a first key pair including a first private key and a first public key as part of an autonomous vehicle registration process. The operations further include providing the first public key to one or more remote computing systems. The operations further include determining whether a reset event occurred at the autonomous vehicle. The operations further include, in response to determining that the reset event occurred, discarding the first key pair as the current key pair and generating a second key pair as the current key pair, the second key pair including a second private key and a second public key. The operations further include receiving a status query from one of the one or more remote computing systems. The operations further include generating a response to the status query, the response being signed using either the first private key or the second private key. The operations further include providing the response to the one of the one or more remote computing systems.

Another example aspect of the present disclosure is directed to a computer-implemented method for secure area tamper and/or access detection. The method includes generating, by a computing system including one or more computing devices, a first key pair including a first private key and a first public key to be stored as a current key pair as part of a vehicle registration process. The method further includes providing, by the computing system, the first public key to one or more remote computing systems. The method further includes determining, by the computing system, whether a reset event occurred at a vehicle. The method further includes, in response to determining that the reset event occurred, discarding the first key pair as the current key pair and generating, by the computing system, a second key pair including a second private key and a second public key as the current key pair. The method further includes receiving, by the computing system, a status query from one of the one or more remote computing systems. The method further includes generating, by the computing system, a response to the status query, the response being signed using either the first private key or the second private key. The method further includes providing, by the computing system, the response to the one of the one or more remote computing systems.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a block diagram of an example computing system according to example embodiments of the present disclosure.

DETAILED DESCRIPTION

Figure 1:
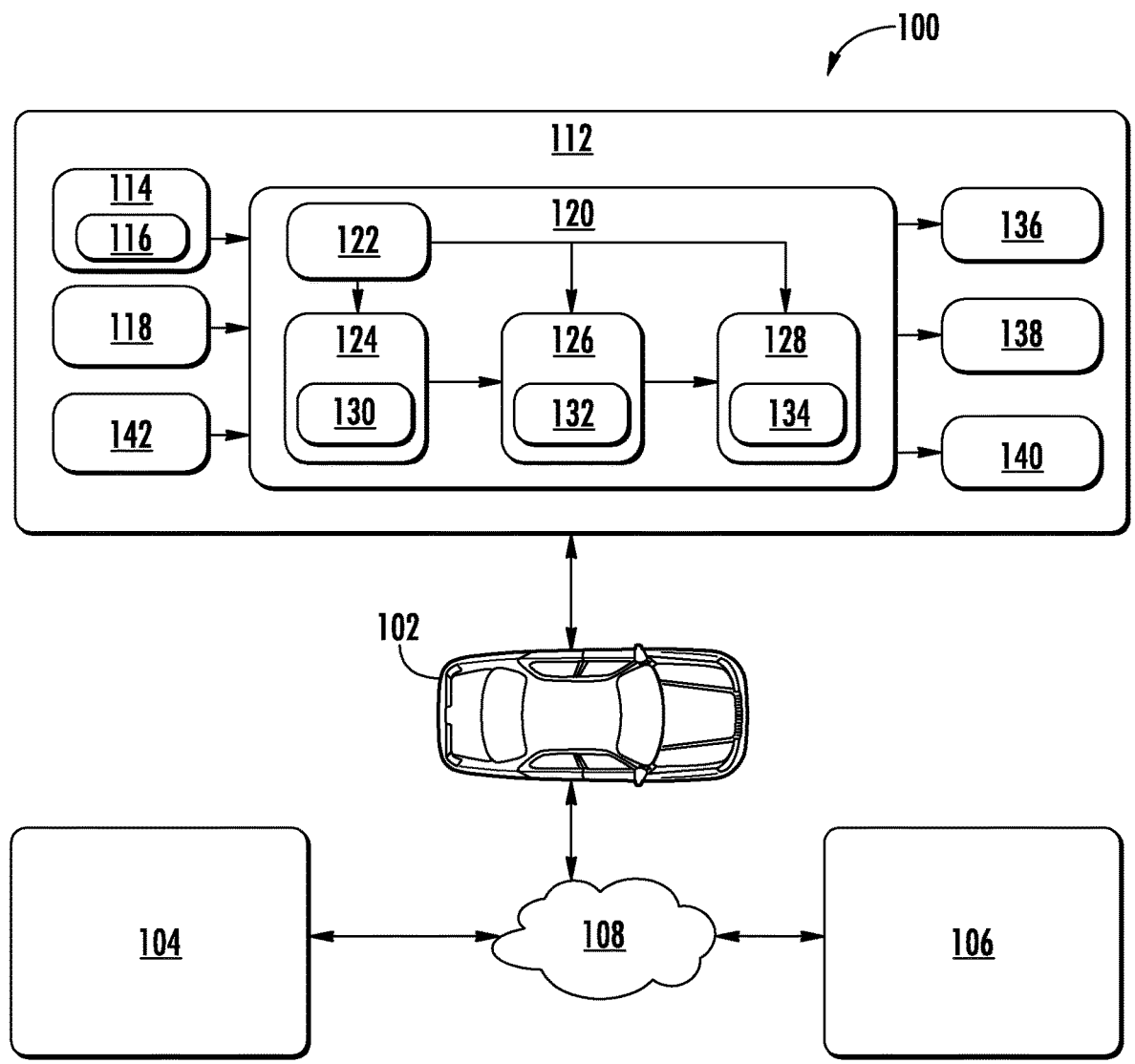
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing for the detection of access and/or tampering associated with a secured area of an autonomous vehicle, for example, the computing system(s) within a secure or protected enclosure on-board an autonomous vehicle. In particular, the systems and methods of the present disclosure can facilitate securely and remotely detecting that a secure or protected enclosure, computing system, and/or the like on-board the autonomous vehicle has been accessed, modified, and/or potentially tampered with (e.g., that vehicle systems may no longer be trusted to operate in an appropriate operational domain). The systems and methods of the present disclosure can allow for local and/or remote attestation of the status of one or more secure enclosures/areas on-board the vehicle and the coinciding trustworthiness of system(s) within the enclosure(s). To do so, a tamper detection system (e.g., including one or more tamper detection units/devices, sensors, etc.) can be located on-board the autonomous vehicle (e.g., within the secure/protected enclosure area, etc.) that can provide signals to one or more local computing systems (e.g., vehicle computing system, etc.) and/or remote computing systems (e.g., service entity infrastructure, operations computing system, etc.) indicating that a tamper/access condition has occurred on-board the vehicle (e.g., associated with the secure enclosure/area). Upon receiving an indication that a tamper/access condition occurred on-board an autonomous vehicle, the systems and methods of the present disclosure can allow for signals from the autonomous vehicle (e.g., vehicle computing system, etc.) to no longer be trusted by a local computing system and/or remote computing system and for one or more actions to be initiated accordingly. As such, the systems and methods of the present disclosure can prevent casual access to components (e.g., computing systems, storage, etc.) within secure/protected enclosures and enable on-board signaling that the secure/protected enclosure (e.g., computing system enclosure, etc.) is active.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the entity to provide the vehicle service can be associated with a fleet of the entity. For example, the entity (e.g., the service provider) may own, lease, etc. a fleet of autonomous vehicles that can be managed by the entity (e.g., the service provider computing system(s), etc.) to provide one or more vehicle services. To increase assurance of the security and safety of the vehicle fleet, including a vehicle's physical and computing system security, systems and methods of the present disclosure provide mechanisms to detect that a vehicle's compute enclosure, storage, and/or systems have been accessed, modified, manipulated, and/or that new device(s) have been introduced within an enclosure.

According to an aspect of the present disclosure, a tamper detection system can be utilized on-board an autonomous vehicle to provide such security. The tamper detection system can include one or more tamper detection device(s) (e.g., computing device, microcontroller, etc.) that can be positioned within a secure/protected enclosure (e.g., vehicle computing system enclosure, sensor enclosure, storage enclosure, etc.) of an autonomous vehicle. The tamper detection device(s) can receive signals from one or more sensors, switches, devices and/or the like associated with the secure/protected enclosure (e.g., tamper sensors, switches, etc. positioned within the enclosure) indicative of an enclosure access/tamper event. The tamper detection device(s) can be positioned within the enclosure it is configured to protect such that the signal(s) from the tamper sensor(s) to the tamper detection device cannot be falsified, counterfeited, corrupted, etc. The tamper detection device can provide signals (e.g., synchronously, asynchronously, when queried, etc.) to one or more local computing systems (e.g., computing systems onboard the vehicle) and/or one or more remote computing systems (e.g., service entity infrastructure, operations computing system, etc.) that are indicative of the occurrence of the access/tamper event on-board the autonomous vehicle.

In particular, a tamper detection device can store a set of encryption keys and these encryption keys can be used by the tamper detection device to cryptographically assert that its tamper-reactive inputs have not been triggered (e.g., that an access/tamper condition has not occurred at the enclosure). If any of the tamper detection device's inputs/signals are triggered (e.g., access/tamper condition occurs, device error, etc.), then the tamper detection device's current encryption keys can be securely discarded and/or securely invalidated (e.g., without possibility of recovery) and new encryption keys can be immediately and securely regenerated. The tamper detection device can be powered by the on-board power system and provided with persistent backup power (e.g., backup battery, etc.) such that the tamper detection device is always powered-on regardless of the status of the autonomous vehicle power system. Accordingly, even if the vehicle computing system power and/or communications are disabled, the tamper detection device can reliably indicate (e.g., to a remote computing system upon query on a periodic, scheduled, random, etc. basis) whether an access/tamper condition occurred with respect to the enclosure once the vehicle computing system power and/or communications are enabled. In the event that the tamper detection device were to lose power (e.g., backup power failure, etc.), the device's power failure would trigger a tamper condition (e.g., securely discard the current encryption keys and generate new keys).

In some implementations, the tamper detection system can ensure that a tamper condition immediately (e.g., executes in less than 10 ms, etc.) securely clears the key memory locations (e.g., securely discards data, securely invalidates data, etc.) for both remote and local attestation. In some implementations, tamper conditions can include, for example, a tamper-reactive input going above or below a threshold voltage; a tamper-reactive input being removed, floated, or cut; a tamer detection device protocol asserting a remote tamper event (e.g., via $I^2C$, etc.); power loss to a tamper detection device; a tamper detection device is accessed by any pin other than the pins reserved for the protocol (e.g., $I^2C$, etc.); spurious device signals; and/or the like. In some implementations, the firmware running a tamper detection device can be embedded in secured and/or read-only memory.

Because the tamper detection device can respond to an access/tamper condition by securely discarding/invalidating the current encryption keys and generating new encryption keys, when the tamper detection device is later queried for a status (e.g., interrogated with a handshake protocol from a remote computing system, etc.), the tamper detection device will respond with an invalid response (e.g., failed/incorrect handshake) due to the newly generated encryption keys. Because of the use of cryptographic primitives and other device specific protections, this handshake protocol cannot be spoofed, replayed, or otherwise manipulated, even over a potentially untrusted medium (e.g., CAN/LTE, etc.). Once the access/tamper condition of the enclosure has been resolved (e.g., the enclosure is secured and the tamper sensor(s) engaged, reviewed by an authorized user/technician, etc.) the tamper detection device's encryption keys can be re-provisioned (e.g., registered with a service entity infrastructure, operations computing system, etc.) to return the vehicle/detection system to an operational status. Such tamper detection device properties coupled with a cryptographic on-board and off-board runtime handshake protocol can securely detect and remotely attest the status of the access/tamper conditions within the vehicle. As such, the tamper detection device can provide mechanisms for a remote cryptographically-assured tamper-detection protocol for autonomous vehicles.

According to another aspect of the present disclosure, a provisioning process can be provided that includes registering the public key of an autonomous vehicle (e.g., a tamper detection device, etc.) with the remote computing system(s) (e.g., service entity infrastructure, operations computing system, etc.). When powered-on, for example during provisioning of an autonomous vehicle, a tamper detection device (e.g. computing device, microcontroller, etc.) positioned within a secure/protected enclosure of an autonomous vehicle can immediately generate new encryption keys (e.g. private/public key pair) and enable the publishing/registration of the associated public keys. These public keys can then be registered on-board the autonomous vehicle (e.g., within a trusted platform module (TPM)), as well as securely provided to remote computing system(s) (e.g., service entity infrastructure, operations computing system, etc.) for registration. Registration of the public key can include an attestation by an authorized user (e.g., a technician, etc.) to ensure the validity of the public key and the readiness of the autonomous vehicle. In some implementations, securely providing the public key includes the public key being signed in some manner, for example, by another asymmetric key within the secure/protected enclosure. This signature can ensure that the tamper detection device, when powered-on and verified, for example, by an authorized user (e.g., technician, etc.) will provide a peered trust.

For example, a provisioning sequence can include an authorized user (e.g., technician, etc.) ensuring that the enclosure is secured and that one or more tamper switches associated with the enclosure are properly engaged. The tamper detection device can then generate new encryption keys. The authorized user (e.g., technician, etc.) can then verify that vehicle communications are enabled and initiate vehicle release attestation operations (e.g., attestation, registration, and/or authentication of the public key, asserting that the vehicle is ready to be placed in service, etc.), for example, via a remote computing system (e.g., service entity infrastructure, operations computing system, etc.). In some implementations, the authorized user can be required to provide security credentials to initiate the attestation operations.

The remote computing system (e.g., service entity infrastructure, operations computing system, etc.) can send a request to the autonomous vehicle (e.g., vehicle computing system, etc.) for the new public key associated with the tamper detection device. The autonomous vehicle (e.g., vehicle computing system, etc.) can obtain the new public key from the tamper detection device and provide the public key to the remote computing system. The remote computing system can store the public key associated with the autonomous vehicle, such that it can be used to verify future responses from the autonomous vehicle (e.g., the tamper detection device). In some implementations, the remote computing system will request attestation or authentication from the authorized user to verify the autonomous vehicle is associated with the received public key before registering the public key for the autonomous vehicle. In some implementations, cryptographic primitives present in the computing system can be utilized to also attest to the data in combination with the authorized user's assertion and/or inspection.

In some implementations, the remote computing system (e.g., service entity infrastructure, operations computing system, etc.) can validate the public key received from the autonomous vehicle and provide a certificate back to the autonomous vehicle (e.g., sign the public key with a remote authority, etc.), for example, to indicate that the remote computing system (e.g., service entity infrastructure, operations computing system, etc.) registered and trusts the public key.

According to another aspect of the present disclosure, the autonomous vehicle (e.g., a tamper detection device) can respond to queries from a remote computing system (e.g., service entity infrastructure, operations computing system, etc. that has registered the public key of the autonomous vehicle) regarding the status of the tamper detection device. For example, in some implementations, the remote computing system (e.g., service entity infrastructure, operations computing system, etc.) can generate a status request query (e.g., including a token and timestamp, etc.) and provide the status request query to the autonomous vehicle (e.g., vehicle computing system, etc.). In some implementations, the autonomous vehicle (e.g., tamper detection system, etc.) can validate that the sender of the status request query is authorized. The tamper detection device can generate a response (e.g., including the original token and timestamp, etc.) and sign the response with its private key. The autonomous vehicle (e.g., vehicle computing system, etc.) can then provide the signed response back to the remote computing system (e.g., service entity infrastructure, operations computing system, etc.). The remote computing system can then use the public key associated with the autonomous vehicle that it stored as part of a provisioning process to verify the received response. If the tamper detection device has not detected an access/tamper condition since the provisioning process was completed, the remote computing system can determine that the response is valid (e.g., that the response was signed with a private key associated with the registered public key, etc.), thereby indicating that the protected enclosure associated with the autonomous vehicle has not been accessed and/or tampered with. If the tamper detection device has detected an access/tamper condition prior to receiving the status request query, the tamper detection device would have discarded the encryption keys associated with the public key that is registered at the remote computing system and generated new encryption keys. As such, the signed response provided to the remote computing system would be signed using the tamper detection device's newly generated encryption keys, and therefore the remote computing system would determine that the signed response is invalid (e.g., does not match the registered public key, etc.) and that a tamper condition occurred at the autonomous vehicle. The remote computing system can then implement one or more actions based on determining that a tamper condition occurred, such as for example, no longer trusting data/signals received from one or more computing systems onboard the autonomous vehicle. Additionally, in some implementations, the tamper detection device can receive and respond to status queries from one or more local computing systems onboard the autonomous vehicles and the local computing system(s) can implement action(s) based on the occurrence of a tamper condition.

According to an aspect of the present disclosure, the tamper detection system can provide for isolated encryption key storage, for example, providing for an implicit distrust of the computing systems that the tamper detection device is communicating with (e.g., vehicle computing system, etc.). As such, if the other computing systems (e.g., vehicle computing system, etc.) are compromised, based on the strict protocol provided for the tamper detection device, the encryption keys cannot be accessed.

In some implementations, the systems and methods of the present disclosure can provide for detecting access, manipulation, modification, and/or the like to a plurality of protected enclosures and/or areas within or associated with an autonomous vehicle. For example, in some implementations, tamper detection systems (e.g., computing device(s), sensor(s), etc.) can be located within any protected enclosure associated with a vehicle, such as a roof pod, sensor system enclosure, port enclosure within a vehicle cabin (e.g., USB port, charging port, etc.) and/or the like, and provide for detection of access and/or manipulation of any of these protected enclosures. In some implementations, a protected enclosure can include multiple detection devices, for example, where a protected enclosure may be accessed by multiple means or in multiple locations, where it may be desirable to monitor different levels of tampering/access to or within an enclosure, and/or the like.

According to another aspect of the present disclosure, the detection system can provide signals with regard to the detection of access and/or tampering of a protected enclosure/area associated with an autonomous vehicle to one or more remote computing systems and/or one or more local systems on-board the autonomous vehicle. Once the detection signal has been obtained by a remote computing system and/or local computing system, the computing system can use the signal as an input for decisions regarding one or more appropriate actions to be taken in response. For example, a remote computing system (e.g., operations computing system) can use the signal indicative of an access/tampering detection signal with other inputs, such as the vehicle operation/state prior to the detection, whether passengers are in the vehicle, the level of access/tampering, and/or the like, in determining one or more actions that should be initiated in response to the detection, such as locating another vehicle to transfer passengers, park and discontinue vehicle operations, disable access to one or more vehicle ports, and/or the like.

Various means can be configured to perform the methods and processes described herein. For example, a computing system can include key generation unit(s), key handling unit(s), response generation unit(s), sensor/tamper detection unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to generate, as a current key pair, a first encryption key pair including a first private key and a first public key, as part of an autonomous vehicle provisioning/registration process (e.g., a verification of the service readiness of the vehicle). In some implementations, the means can be configured to securely provide the first public key to one or more remote computing systems (e.g., remote operations computing system(s), etc.) as part of the autonomous vehicle provisioning/ registration process. A key generation unit and/or a key handling unit are examples of means for generating such encryption key pairs and providing such public keys to remote computing systems as described herein.

The means can be configured to determine whether a reset event has occurred at the autonomous vehicle (e.g., associated with a secure/protected enclosure). For example, the means can be configured to receive input data from one or more sensors (e.g., tamper detection sensors) and/or the like positioned within a secure/protected enclosure onboard the autonomous vehicle. In some implementations, the means can be configured to determine a reset operation should be initiated by the tamper detection device based on the sensor data. In some implementations, the means can be configured to determine the status of the tamper detection device (e.g., a loss and restoration of power to the tamper detection device, device errors, etc.) and determine that a reset operation should be initiated by the tamper detection device based on the determined device status. A sensor/tamper detection unit is one example of a means for receiving sensor input data and/or determining to initiate a reset operation as described herein.

The means can be configured to securely discard the first encryption key pair in response to the initiation of a reset operation. For example, based on detection of tampering of the secure/protected enclosure onboard the autonomous vehicle, the means can be configured to clear the stored first encryption key pair from a memory associated with the tamper detection device. The means can be configured to generate a second encryption key pair including a second private key and a second public key as the current key pair (e.g., in response to a reset operation). A key handling unit is one example of a means for securely discarding the first encryption key pair as described herein. A key generation unit is one example of a means for generating a second encryption key pair as described herein.

The means can be configured to receive a status query provided from one or more remote computing systems (e.g., remote operations computing system(s), etc.) and/or local computing systems. The means can be configured to generate a response to the status query (e.g., by performing one or more operations on data associated with the status query, etc.). The means can be configured to sign the response using the first private key or the second private key. For example, the means can obtain (e.g., via an accessible memory) the private key of the current key pair (e.g., first private key or second private key) and sign the generated status query response using the obtained first private key or second private key. A response generation unit is one example of a means for generating a response and/or signing a response as described herein. A key handling unit is one example of a means for providing a first private key or second private key for use in signing a response as described herein.

The means can be configured to provide the signed response to the one or more remote computing systems (e.g., remote operations computing system(s), etc.) and/or local computing systems, for example, to allow for determination of the status of the secure/protected enclosure onboard the autonomous vehicle. For example, a remote computing system can use the signed response in determining whether the secure/protected enclosure has been tampered with (e.g., response is signed with second private key) or not (e.g., response is signed with first private key). A response generation unit is one example of a means for providing the signed response as described herein.

The systems and methods described herein provide a number of technical effects and benefits. For instance, the systems and methods can provide remotely reliable and resilient signals that a secured enclosure/area associated with an autonomous vehicle (e.g., computing system enclosure, storage, etc.) was accessed, thereby increasing confidence in the detection of physical access and informing remote systems in regard to the trustworthiness of signals from the autonomous vehicle (e.g., vehicle computing system, etc.). Accordingly, by allowing for remote detection of access/tampering and attestation of vehicle system(s) trustworthiness, the systems and methods can provide for increased operational safety of vehicles as well as the safety and comfort of vehicle passengers.

The systems and methods described herein also provide the technical effect and benefit of providing for on-going monitoring of vehicle computing system security and integrity, thereby allowing for more timely intervention to ensure vehicle safety. For instance, the systems and methods of the present disclosure improve the ability of the vehicle's onboard computing technology (and its off-board/remote support systems) to more securely and reliably detect tampering of a vehicle's onboard systems. By way of example, a computing system (e.g., a tamper computing system including one or more tamper detection units/devices, etc.) can generate, as a current key pair, a first key pair including a first private key and a first public key as part of a vehicle registration process. The computing system can provide the first public key to one or more remote computing systems (e.g., located remotely from the computing system, off-board the vehicle, etc.). The computing system can determine whether a reset event occurred at a vehicle. The computing system can, in response to determining that the reset event occurred, discard the first key pair as the current key pair and generating a second key pair including a second private key and a second public key as the current key pair. The computing system can receive a status query from one of the one or more remote computing systems. The computing system can generate a response to the status query, the response being signed using either the first private key or the second private key. The computing system can provide the response to the one of the one or more remote computing systems.

With reference to the figures, example embodiments of the present disclosure will be discussed in further detail.

FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a tamper/access detection system 142.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the status of one or more vehicle systems, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, a sleep mode, and/or the like. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the vehicle, the state of one or more passengers of the vehicle, and/or the state of an environment in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel. Additionally, the vehicle computing system 112 can include and/or be associated with a tamper/access detection system 142.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

The vehicle computing system 112 can include and/or be associated with a tamper/access detection system 142. The tamper/access detection system 142 can provide for detection of tampering with and/or access to one or more secured areas of the vehicle 102, for example, computing devices(s) and/or system(s) (e.g., associated with the vehicle computing system 112, etc.) positioned within a secure or protected enclosure on-board the vehicle 102. For example, the tamper/access detection system 142 can facilitate securely and remotely detecting that a secure or protected enclosure, computing system, and/or the like on-board the vehicle 112 has been accessed, modified, and/or potentially tampered with (e.g., such that vehicle systems may no longer be trusted to operate in an appropriate operational domain). The tamper/access detection system 142 (e.g., including one or more tamper detection units/devices, sensors, etc.) can be located on-board the vehicle 112, for example, within a secure/protected enclosure area, etc., and can generate signals that can be provided to remote computing system(s) (e.g., operations computing system 104, etc.) and/or local computing systems indicating that a tamper/access condition has occurred on-board the vehicle 112 (e.g., associated with the secure enclosure/area).

Figure 2:
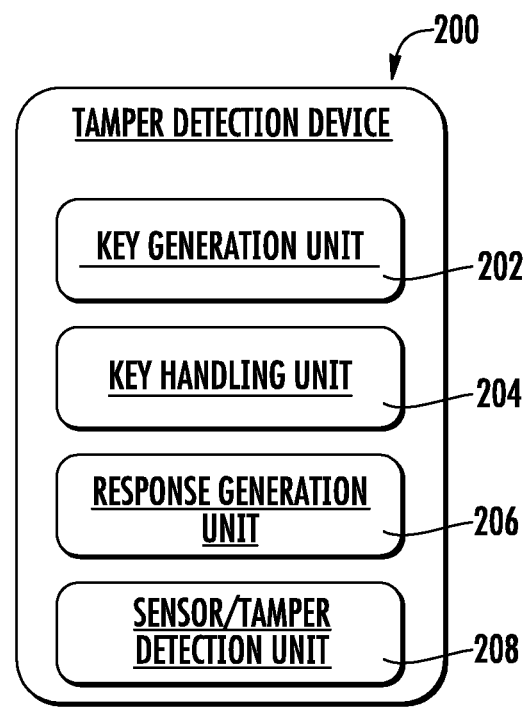
FIG. 2 depicts an example tamper detection device according to example embodiments of the present disclosure.

Various means can be configured to perform the methods and processes described herein. For example, FIG. 2 depicts a diagram of an example tamper detection device 200 that includes various means according to example embodiments of the present disclosure. The tamper detection device 200 can include key generation unit(s) 202, key handling unit(s) 204, response generation unit(s) 206, sensor/tamper detection unit(s) 208, and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., 500) and/or other operations described herein can be implemented as such algorithm(s). For instance, the means (e.g., the key generation unit(s) 202) can be configured to generate a first encryption key pair including a first private key and a first public key, as part of an autonomous vehicle registration process (e.g., as part of a verification of the service readiness of the vehicle). In some implementations, the means (e.g., the key generation unit(s) 202, the key handling unit(s) 204) can be configured to provide the first public key to one or more remote computing systems (e.g., service entity infrastructure, remote operations computing system(s), etc.) as part of the autonomous vehicle registration process. In some implementations, the means (e.g., the key generation unit(s) 202, etc.) can provide for securely generating encryption keys (e.g., 2048-bit RSA private keys and RSA F4 public exponent, etc.). The means (e.g., the key generation unit(s) 202, etc.) can provide for rapid generation of the keys (e.g., less than 5 seconds, etc.). The means (e.g., the key generation unit(s) 202, the key handling unit(s) 204) can also provide for the private keys to never be exposed outside of the RAM of the device (e.g., tamper detection device 200).

The means (e.g., the sensor/tamper detection unit(s) 208) can be configured to determine whether a reset event has occurred at the autonomous vehicle. For example, the means (e.g., the sensor/tamper detection unit(s) 208) can be configured to receive input data from one or more sensors (e.g., tamper detection sensors, etc.) and/or the like positioned within a secure/protected enclosure onboard the autonomous vehicle. In some implementations, the means (e.g., the sensor/tamper detection unit(s) 208) can be configured to determine a reset operation should be initiated by the tamper detection device based on the sensor data. In some implementations, the means (e.g., the sensor/tamper detection unit(s) 208) can be configured to determine the status of the tamper detection device (e.g., a loss and restoration of power to the tamper detection device, etc.) and determine that a reset operation should be initiated by the tamper detection device based on the determined device status.

The means (e.g., the key handling unit(s) 204) can be configured to discard the first encryption key pair in response to the initiation of a reset operation. For example, based on detection of tampering of the secure/protected enclosure onboard the autonomous vehicle, the means (e.g., the key handling unit(s) 204) can be configured to clear the stored first encryption key pair from a memory associated with the tamper detection device. The means can be configured to generate a second encryption key pair including a second private key and a second public key as the current key pair (e.g., in response to a reset operation). A key handling unit is one example of a means for discarding the first encryption key pair as described herein. A key generation unit is one example of a means for generating a second encryption key pair as described herein.

The means (e.g., the response generation unit(s) 206) can be configured to receive a status query provided from one or more remote computing systems (e.g., service entity infrastructure, remote operations computing system(s), etc.). The means (e.g., the response generation unit(s) 206) can be configured to generate a response to the status query (e.g., by performing one or more operations on data associated with the status query, etc.). The means (e.g., the response generation unit(s) 206) can be configured to sign the response using the first private key or the second private key. For example, the means (e.g., the response generation unit(s) 206, the key handling unit(s) 204) can obtain (e.g., via an accessible memory) the private key of the current key pair (e.g., first private key or second private key) and the means (e.g., the response generation unit(s) 206) can sign the generated status query response using the obtained first private key or second private key.

The means (e.g., the response generation unit(s) 206) can be configured to provide the signed response to the one or more remote computing systems (e.g., service entity infrastructure, remote operations computing system(s), etc.), for example, to allow for determination of the status of the secure/protected enclosure onboard the autonomous vehicle. For example, a remote computing system can use the signed response in determining whether the secure/protected enclosure has been tampered with (e.g., response is signed with second private key) or not (e.g., response is signed with first private key).

These described functions of the means are provided as examples and are not meant to be limiting. The means can be configured for performing any of the operations and functions described herein.

Figure 3:
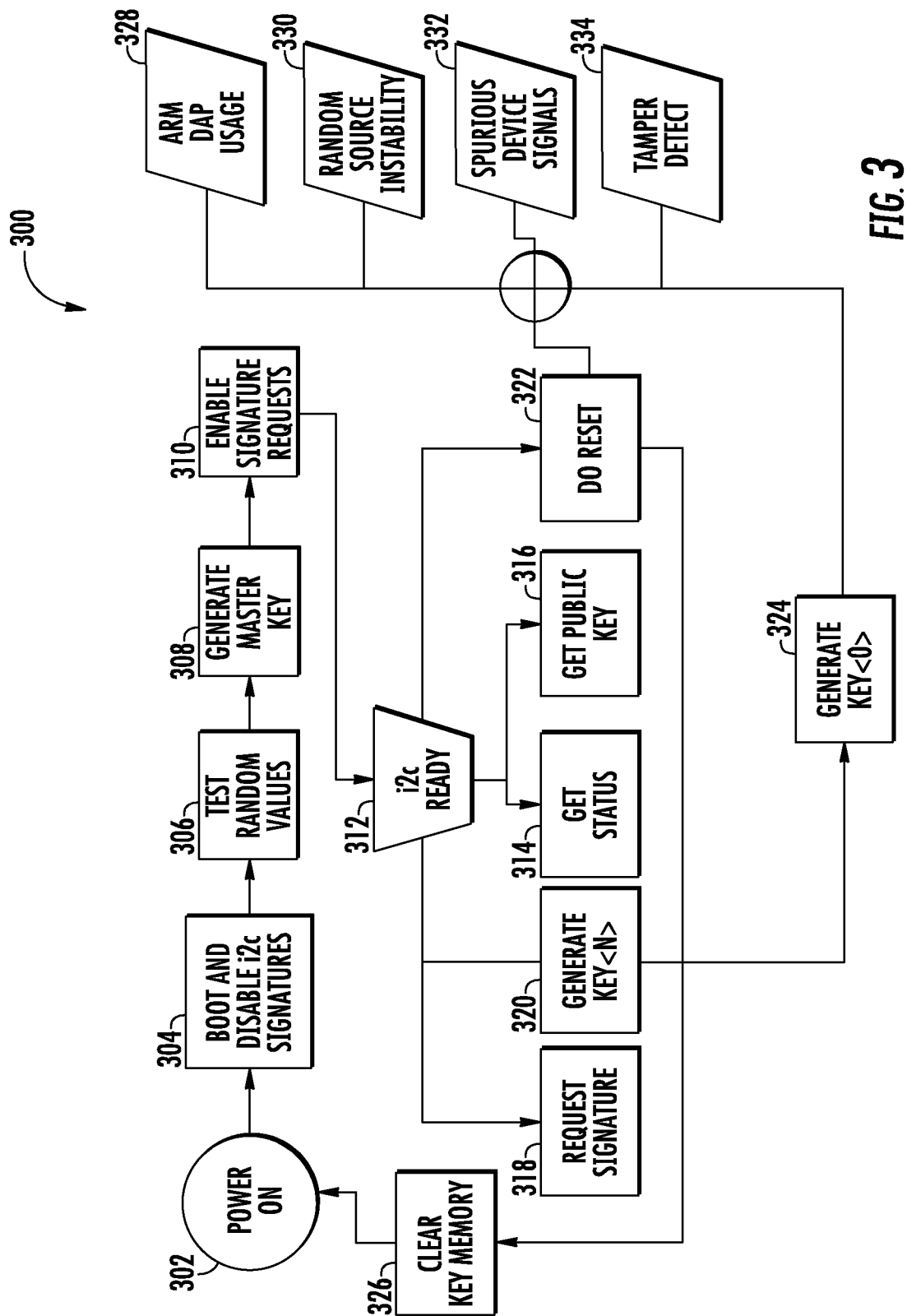
FIG. 3 depicts an example state diagram for a detector according to example embodiments of the present disclosure.

FIG. 3 depicts an example state diagram 300 for a tamper detection device according to example embodiments of the present disclosure. As described herein, a tamper detection system can include one or more tamper detection device(s) (e.g., computing device, microcontroller, etc.) that can be positioned within a secure/protected enclosure (e.g., vehicle computing system enclosure, sensor enclosure, storage enclosure, etc.) of an autonomous vehicle. The tamper detection device(s) can provide for using a protocol (e.g., inter-integrated circuit (I2C) protocol, etc.) which can be used to attest cryptographically to the status of one or more inputs (e.g., tamper-reactive electronic input(s), etc.) over untrusted communication channels. The tamper detection device(s) can receive signals from one or more sensors associated with the secure/protected enclosure (e.g., tamper sensors positioned within the enclosure, etc.) that can be indicative of an enclosure access/tamper event and/or condition. A tamper detection device can operate via a number of states, such as illustrated in state diagram 300.

Operation of a tamper detection device can be initiated in a power on state 302, for example, during a provisioning process associated with the autonomous vehicle (e.g., preparing a vehicle to return to operational service, etc.) and/or after a reset event is triggered. In some implementations, the provisioning process can include an authorized user (e.g., technician, etc.) ensuring that a protected enclosure onboard the vehicle is secured; that one or more tamper devices, switches, etc. associated with the enclosure are properly engaged; and powering on the tamper detection device. The tamper detection device can proceed to a boot state 304 where the tamper detection device can initiate a boot sequence of the firmware/software stored in a memory of the tamper detection device. The tamper detection device can enter a test random values state 306 where the tamper detection device can verify operation of a random value generator. The tamper detection device can enter a generate master key state 308 where the tamper detection device can generate the private encryption key to initially be used by the tamper detection device. The generated private encryption key can be used by the tamper detection device to cryptographically sign responses to status queries from one or more other computing systems (e.g., local computing systems onboard the vehicle, remote computing systems, etc.), where a cryptographically signed response can provide indication of whether the tamper detection device's tamper-reactive inputs have been triggered (e.g., whether an access/tamper event/condition has occurred associated with the enclosure). In some implementations, the generate master key state 308 can include obtaining a request including, for example, a signed integer key slot, action to securely generate the key (e.g., key 0), and a response including status bits indicative of the completed state operations. The tamper detection device can enter an enable signature requests state 310 where the tamper detection device can be enabled to receive requests to sign responses to status queries from other computing systems.

The tamper detection device can proceed to a ready state 312 where the device protocol is ready to receive and respond to status query requests, as well perform operations associated with a reset in response to a tamper event/condition. The tamper detection device operations can iteratively return to the ready state 312 after completing status query response operations.

The tamper detection device can proceed to a get status state 314 where the tamper detection device can obtain the values in a status register. For example, in some implementations, the get status state 314 can include retrieving status register data including number of keys, status flags (e.g., ready, response available, unrecoverable fault codes, busy, etc.), and a signature count. The tamper detection device can proceed to a get public key state 316 where the tamper detection device can generate a public encryption key. In some implementations, the get public key state 316 can include obtaining a request with, for example, an unsigned integer key slot, actions to calculate a public key from the private key, and a response including the public key.

The tamper detection device can proceed to a request signature state 318, where the tamper detection device can generate a signature using a key, for example, to sign a response to a status query. In some implementations, the request signature state 318 can include a request including a random nonce and an unsigned integer key slot. The request signature state 318 can include actions to generate a nonce, combine the request nonce with the generated nonce (e.g., via Keyed-Hashing for Message Authentication (HMAC) SHA256, etc.) for a message authentication code, and sign the message authentication code (e.g., HMAC SHA256, etc.) with the key from the key slot (e.g., using RSA PKCS1.5, etc.). The request signature state 318 can include a response including status bits, the unsigned integer key slot, the calculated signature, and the generated nonce.

The tamper detection device can enter a generate key <N> state 320 where the tamper detection device can generate new encryption keys. The tamper detection device can enter a generate key <0> state 324 where the tamper detection device can generate new initial encryption key.

The tamper detection device can enter a reset state 322 where the tamper detection device can initiate operations in response to the occurrence a tamper event/condition (e.g., receiving a tamper event/condition input, etc.), such as, for example, discarding the encryption key(s) currently stored by the tamper detection device (e.g., stored in a memory onboard the detection device) and generating new encryption key(s). The reset state 322 can initiate a clear key memory state 326 where the tamper detection device can securely discard or securely invalidate the currently stored encryption key(s), for example, by applying a combination of software and/or hardware mechanisms utilized by secure devices for such a purpose. The tamper detection device can then generate new encryption key(s), for example by returning to power on state 302 following the completion of operations in the clear key memory state 326.

The reset state 322 can be triggered upon indication of one or more tamper event/condition signals. For example, in some implementations, a reset can be triggered by signals such as debug access port usage 328, random source instability 330, spurious device signals 332, tamper detection signal 334 (e.g., input signal from a tamper device, sensor, etc.), and/or the like.

Figure 4:
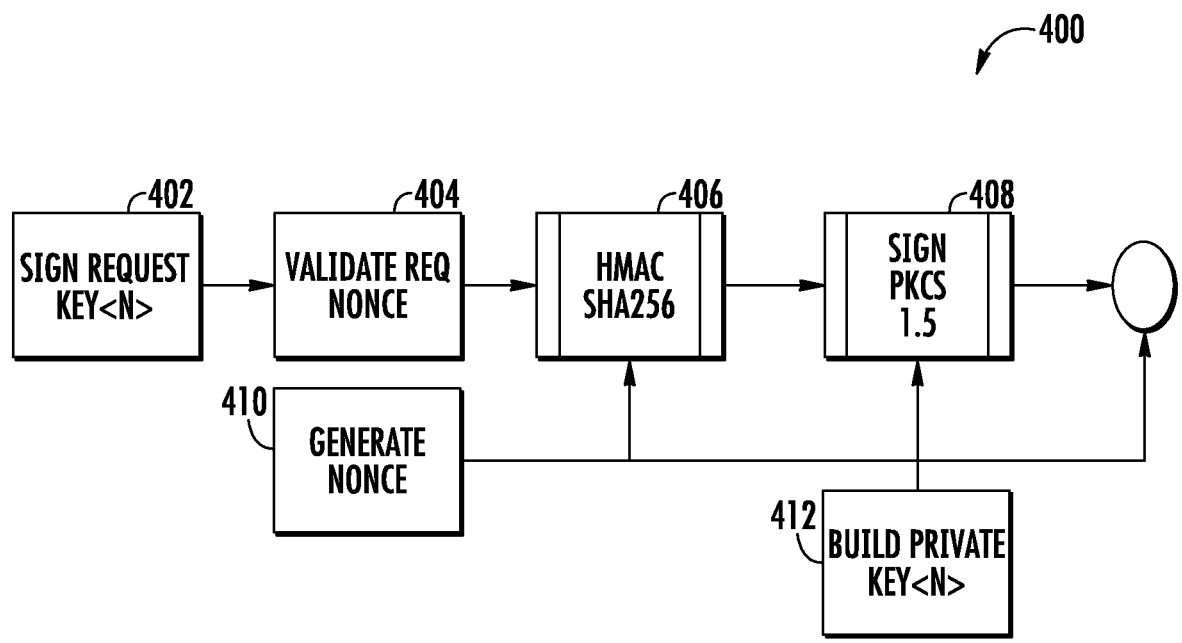
FIG. 4 depicts an example detector signature process according to example embodiments of the present disclosure.

FIG. 4 depicts an example tamper detection device signature process 400 according to example embodiments of the present disclosure. As described herein, a tamper detection system can include one or more tamper detection device(s) (e.g., computing device, microcontroller, etc.) that can be positioned within a secure/protected enclosure (e.g., vehicle computing system enclosure, sensor enclosure, storage enclosure, etc.) of an autonomous vehicle. The tamper detection device(s) can provide for responding to a status query (e.g., from a remote computing system, etc.) by cryptographically signing a response message which can provide an indication regarding the status of the tamper detection device (e.g., to the remote computing system(s), etc.). As illustrated in FIG. 4, a tamper detection device signature process 400 can be initiated by receiving a signature request to generate a signature using a private encryption key at (402). The request received at (402) can include a nonce that can, for example, be used in providing for verification of the request. The signature process 400 can proceed to (404) where the signature process 400 can provide for verifying that the request is valid by performing operation(s) on the nonce that was received as part of the signature request at (402).

At (406), the signature process 400 can provide for computing a cryptographic hash (e.g., using HMAC SHA256, etc.) using the nonce received with the request at (402) and a nonce generated at (410). At (408), the signature process 400 can provide for signing the response (e.g., the hash of the request nonce and the generated nonce) using a private encryption key obtained at (412) (e.g., using RSA PKCS 1.5, etc.). The tamper detection device can then provide for this signed message to be provided to the computing system (e.g., remote computing system, etc.) that generated the status query which triggered the signature request process.

Figure 5:
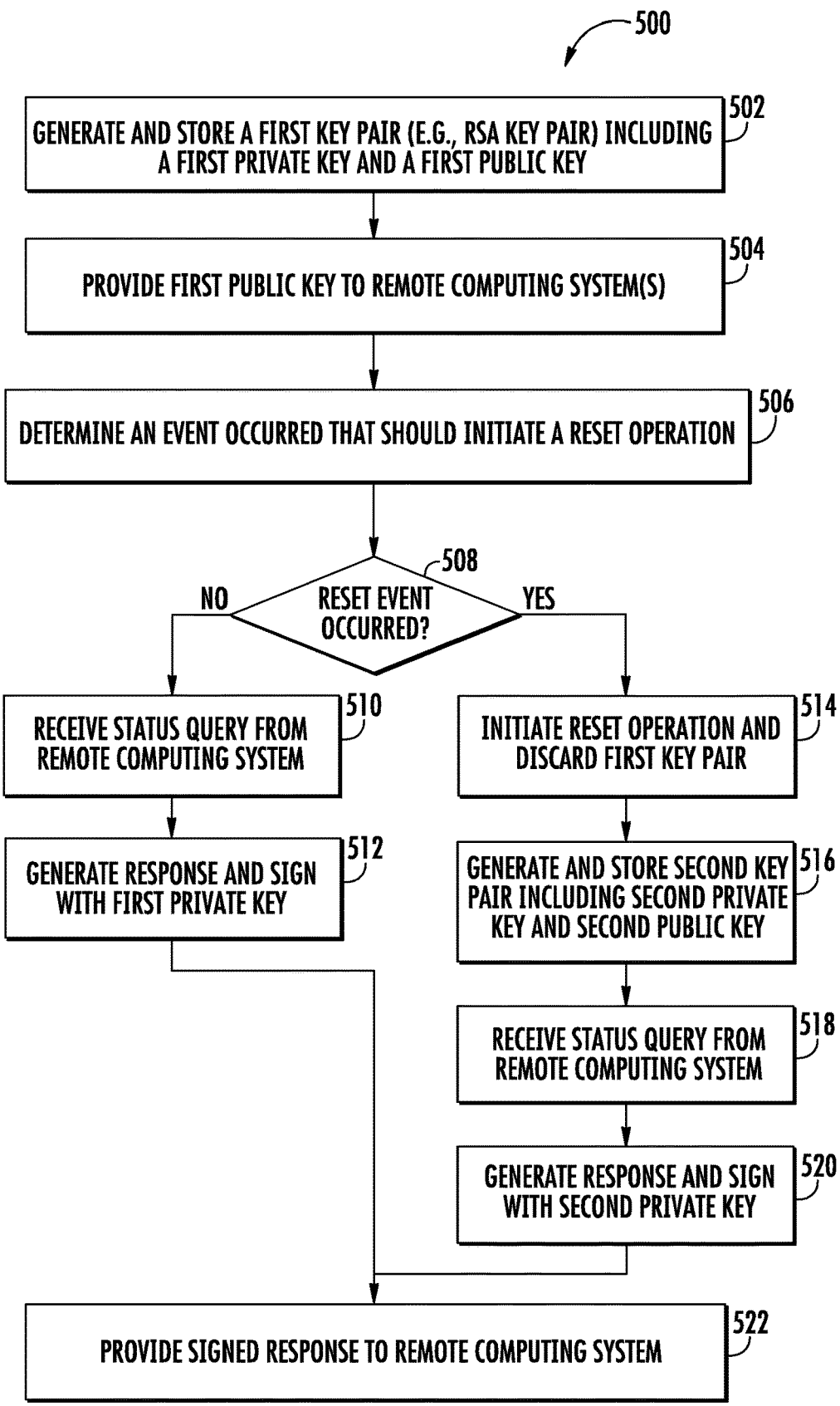
FIG. 5 depicts a flow diagram of example operations for autonomous vehicle tamper/activity detection according to example embodiments of the present disclosure.

FIG. 5 depicts a flowchart diagram of example method 500 including operations for autonomous vehicle tamper/activity detection according to example embodiments of the present disclosure. One or more portion(s) of the method 500 can be implemented by one or more computing devices that include one or more computing devices such as, for example, the operations computing system 104 of FIG. 1, the vehicle computing system 112 of FIG. 1, the computing system 112 of FIG. 7, the remote computing system 720 of FIG. 7, and/or the like. Each respective portion of the method 500 can be performed by any (or any combination) of the one or more computing devices. Moreover, one or more portion(s) of the method 500 can be implemented as an algorithm on the hardware components of the device(s) described herein (e.g., as in FIGS. 1, 2, and 7), for example, to provide for detection of tampering with and/or access to one or more secured areas of an autonomous vehicle as described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include generating and storing a first encryption key pair including a first private key and a first public key. For example, a computing system (e.g., tamper detection system 142, tamper detection device 200, computing system 701, etc.) positioned within a secure/protected enclosure onboard the vehicle can generate new encryption keys (e.g., first encryption key pair) upon being powered on, such as during a vehicle provisioning sequence/process (e.g., verifying readiness of vehicle to return to service, etc.). In some implementations, a provisioning sequence can include an authorized user (e.g., technician, etc.) ensuring that the secure/protected enclosure is secured, that one or more tamper devices, switches, etc. associated with the secure/protected enclosure are properly engaged, and initiating start of the tamper detection system. The tamper detection system/device can then generate new encryption keys (e.g., first encryption key pair). The authorized user (e.g., technician, etc.) can then verify that vehicle communications are enabled and initiate vehicle release attestation operations (e.g., attesting to readiness of the vehicle, registration/authentication of a public key, etc.), for example, via a remote computing system (e.g. service entity infrastructure, operations computing system, etc. such as operations computing system 104, remote computing system 720, and/or the like). In some implementations, the authorized user can be required to provide security credentials to initiate/perform the attestation operations. In some implementations, cryptographic primitives present in the computing system can be utilized to also attest to the data in combination with the authorized user's assertion and/or inspection.

At (504), the method 500 can include providing the first public key to a remote computing system (e.g. service entity infrastructure, operations computing system, etc. such as operations computing system 104, remote computing system 720, and/or the like). For example, as part of the provisioning process, an authorized user (e.g., technician, etc.) can verify that vehicle communications are enabled and initiate vehicle release attestation operations (e.g., including attestation/registration/authentication of the public key, etc.), for example, via the remote computing system. In some implementations, the remote computing system can send a secure request to the autonomous vehicle (e.g., vehicle computing system, etc.) for the new public key associated with the tamper detection system. The autonomous vehicle (e.g., vehicle computing system, etc.) can obtain the new public key from the tamper detection system and provide the public key to the remote computing system. The vehicle/public key registration with the remote computing system can include a signature, for example, provided by the tamper detection system, to allow for verification that the public key is correct. The remote computing system can register (e.g., store) the public key associated with the autonomous vehicle, such that it can be used to verify future messages (e.g., query responses, etc.) from the autonomous vehicle (e.g., from the tamper detection system, etc.).

At (506), the method 500 can include determining an event occurred (e.g., in relation to a secured area/protected enclosure and/or tamper detection device, etc.) that should initiate a reset operation. For example, a tamper detection system can receive signal(s) from one or more sensors, switches, devices, etc. associated with the enclosure and/or the tamper detection system indicative of a tamper and/or access condition (e.g., opening of enclosure, loss of power to device, device error condition, etc.) associated with the enclosure and/or the tamper detection system.

At (508), the method 500 can include determining whether a reset operation occurred. Upon determining that no reset event occurred, the method 500 can continue to (510). Upon determining that a reset event did occur (e.g., tamper/access condition was indicated, etc.), the method 500 can continue to (514).

At (510), the method 500 can include receiving a status query from the remote computing system, such as during provisioned operations of the vehicle. For example, the autonomous vehicle (e.g., tamper detection system, vehicle computing system, etc.) can respond to queries from a remote computing system (e.g., service entity infrastructure, operations computing system, etc. that has registered the public key of the autonomous vehicle) regarding the status of the tamper detection system. For example, in some implementations, the remote computing system (e.g., service entity infrastructure, operations computing system, etc.) can generate a status request query (e.g., including a token, timestamp, etc.) and provide the status request query to the autonomous vehicle (e.g., vehicle computing system, etc.).

At (512), the method 500 can include generating a response to the status query and signing the response with the first private key. As described herein, a tamper detection device can store a set of encryption keys and these encryption keys can be used by the tamper detection device to cryptographically assert that its tamper-reactive inputs have not been triggered (e.g., that an access/tamper condition has not occurred at the enclosure, no device error, etc.). In some implementations, the autonomous vehicle (e.g., tamper detection system, etc.) can validate that the sender of the status request query is authorized. The tamper detection device can generate a response (e.g., including the received token and timestamp, etc.) and sign the response with its private key (e.g., the first private key previously registered with the remote computing system). The autonomous vehicle (e.g., vehicle computing system, etc.) can then provide the signed response back to the remote computing system (e.g., service entity infrastructure, operations computing system, etc.) at (522).

The remote computing system can then use the public key associated with the autonomous vehicle that it previously stored as part of a provisioning process (e.g., the public key registered for the autonomous vehicle) to verify the received response. If the tamper detection system has not detected an access/tamper condition since the provisioning process was completed, the remote computing system can determine that the response is valid (e.g., that the response was signed with a private key associated with the registered public key), thereby indicating that the protected enclosure associated with the autonomous vehicle has not been accessed and/or tampered with.

At (514), upon determining that a reset event occurred, the method 500 can include initiating a reset operation that includes securely discarding or securely invalidating the first encryption key pair. For example, upon receiving signal(s) indicative of a tamper/access condition, the tamper detection system can securely discard/invalidate the encryption key pair (e.g., first encryption key pair) currently stored in a memory of the tamper detection system, and provide for a reset/restart of the tamper detection system. In some implementations, once an encryption key pair has been discarded/invalidated, the key pair cannot be recovered.

At (516), the method 500 can include generating and storing a second encryption key pair including a second private key and a second public key. For example, upon discarding a stored encryption key pair (e.g., first encryption key pair), the tamper detection device can immediately generate a new encryption key pair (e.g., second encryption key pair) and store the second encryption key pair. The tamper detection device can then use this second key pair in signing and responding to status query requests.

At (518), the method 500 can include receiving a status query from the remote computing system, such as during provisioned operations of the vehicle. For example, the autonomous vehicle (e.g., tamper detection device, vehicle computing system, etc.) can respond to queries from a remote computing system (e.g., that has registered the public key of the autonomous vehicle) regarding the status of the tamper detection device. For example, in some implementations, the remote computing system (e.g., operations computing system, etc.) can generate a status request query (e.g., including a token, timestamp, etc.) and provide the status request query to the autonomous vehicle (e.g., vehicle computing system, etc.).

At (520), the method 500 can include generating a response to the status query and signing the response with the second private key. The tamper detection device can generate a response (e.g., including the received token and timestamp, etc.) and sign the response with its current private key (e.g., the second private key) and can then provide the signed response back to the remote computing system (e.g., operations computing system, etc.) at (522).

As the tamper detection device detected an access/tamper condition prior to receiving the status request query, the tamper detection device would have discarded the public key (e.g., first public key) that is registered at the remote computing system and generated new encryption keys (e.g., second encryption key pair). As such, the signed response provided to the remote computing system would be signed using the tamper detection device's newly generated second encryption key pair, and therefore the remote computing system would determine that the signed response is invalid (e.g., does not match the registered public key) and that a tamper condition occurred at the autonomous vehicle At (522), the method 500 can include providing the signed response to the remote computing system. The remote computing system can validate the signed response and determine whether a tamper/access condition was indicated at the autonomous vehicle and generate an appropriate response to the condition.

Figure 6:
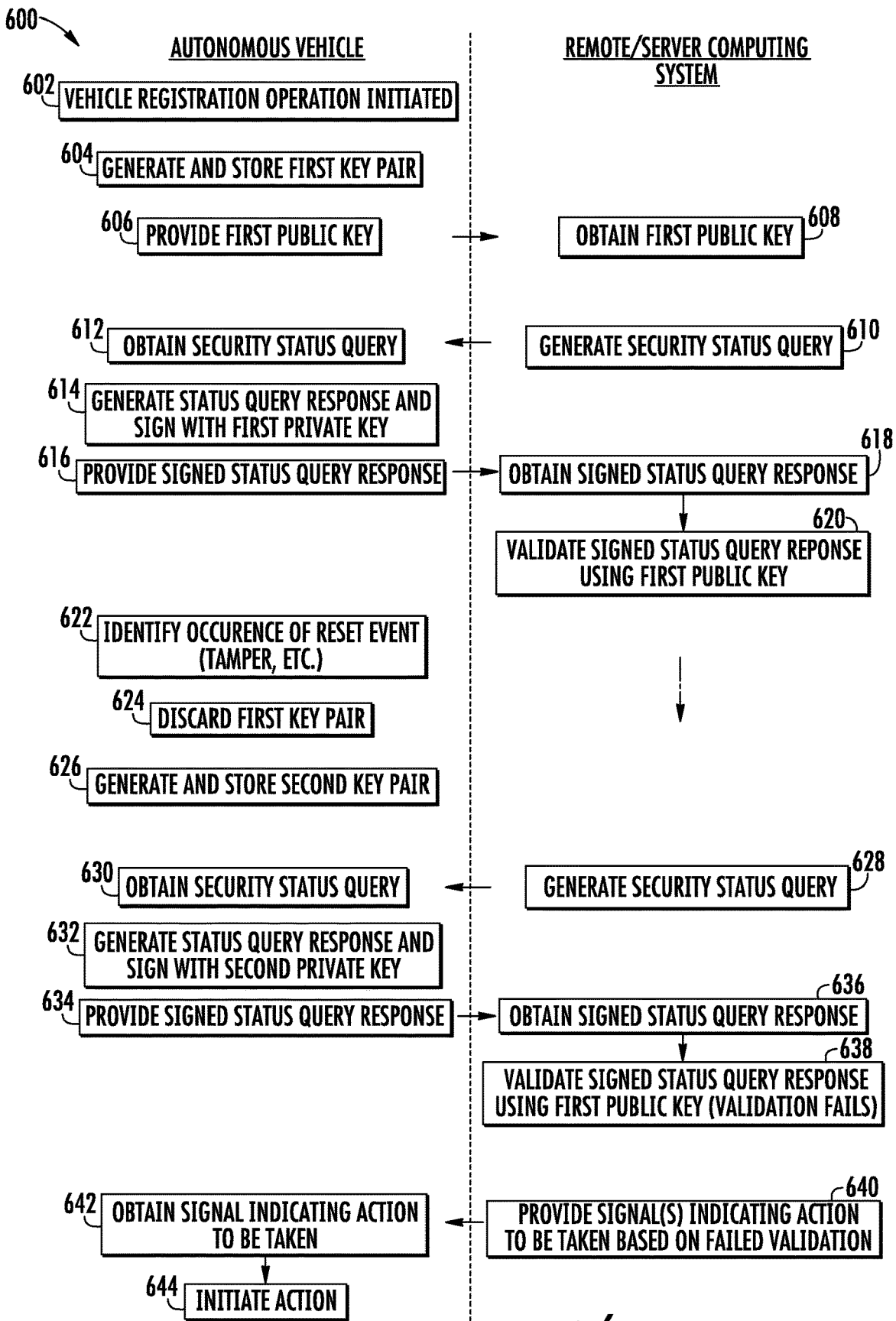
FIG. 6 depicts a flow diagram of example operations of a tamper/activity detection system according to example embodiments of the present disclosure.

FIG. 6 depicts a flow diagram of example operations 600 of a tamper/activity detection system according to example embodiments of the present disclosure. One or more portion(s) of the operations 600 can be implemented by one or more computing systems that include, for example, a vehicle computing system (e.g., vehicle computing system 112, etc.), one or more portions of an operations computing system (e.g., computing system 104, computing system 820, etc.) and/or the like). Each respective portion of the operations 600 can be performed by any (or any combination) of the computing device(s) of the respective computing system. Moreover, one or more portion(s) of the operations 600 can be implemented as an algorithm on the hardware components of the device(s) described herein (e.g., as in FIGS. 1, 2, and 7), for example, to facilitate detection of tampering with and/or access to one or more secured areas of an autonomous vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the operations 600 can include initiating a vehicle registration (e.g., provisioning) process for an autonomous vehicle (e.g., verifying readiness of an autonomous vehicle to begin service operations, etc.).

At (604), the operations 600 can include an autonomous vehicle computing system including one or more computing devices (e.g., tamper detection computing device located within a protected enclosure on-board the autonomous vehicle, such as, tamper detection system 142, tamper detection device 200, computing system 701) generating a first encryption key pair (e.g., first private key and first public key) and storing the first encryption key pair (e.g., via an accessible memory of the tamper detection computing device). For example, the computing device positioned within a secure/protected enclosure onboard the vehicle can generate new encryption keys (e.g., first encryption key pair) upon being powered on, such as during the vehicle provisioning sequence/process. In some implementations, the provisioning sequence can include an authorized user (e.g., technician, etc.) ensuring that the enclosure is secured and that one or more tamper devices, switches, etc. associated with the enclosure are properly engaged. The computing device can then generate new encryption keys (e.g., first encryption key pair). The authorized user (e.g., technician, etc.) can then verify that vehicle communications are enabled and initiate vehicle release attestation operations (e.g., re-registering the public keys), for example, via a remote computing system. In some implementations, the authorized user can be required to provide security credentials to initiate the attestation operations.

At (606), the operations 600 can include the autonomous vehicle (e.g., vehicle computing system, etc.) providing the first public key of the first encryption key pair to a remote computing system (e.g., service provider operations computing system, etc.).

At (608), the operations 600 can include the remote computing system (e.g., service provider operations computing system, etc.) obtaining the first public key from the autonomous vehicle. The remote computing system can associate the received first public key with the autonomous vehicle, for example, as part of registering the autonomous vehicle as operational in a service fleet. For example, as part of the provisioning process, an authorized user (e.g., technician, etc.) can verify that vehicle communications are enabled and initiate vehicle release attestation operations (e.g., re-registering the public keys), for example, via a remote computing system. In some implementations, the remote computing system can send a request to the autonomous vehicle (e.g., vehicle computing system, etc.) for the new public key associated with the tamper detection device. The autonomous vehicle (e.g., vehicle computing system, etc.) can obtain the new public key from the tamper detection device and provide the public key to the remote computing system. The remote computing system can store the public key associated with the autonomous vehicle, such that it can be used to verify future responses from the autonomous vehicle (e.g., the tamper detection device). In some implementations, the remote computing system validate the public key received from the autonomous vehicle and provide a remote certificate back to the autonomous vehicle (e.g., sign the public key with a remote certificate), for example, to indicate that the remote server registered and trusts the public key.

At (610), the operations 600 can include the remote computing system generating, during service operation of the autonomous vehicle, a status query to facilitate determining the status of a protected enclosure/area onboard the autonomous vehicle and providing the status query to the autonomous vehicle (e.g., the vehicle computing system, etc.).

At (612), the operations 600 can include the autonomous vehicle obtaining the status query from the remote computing system. For example, the autonomous vehicle (e.g., tamper detection device, vehicle computing system, etc.) can respond to queries from a remote computing system (e.g., that has registered the public key of the autonomous vehicle) regarding the status of the tamper detection device. For example, in some implementations, the remote computing system (e.g., operations computing system, etc.) can generate a status request query (e.g., including a token, timestamp, etc.) and provide the status request query to the autonomous vehicle (e.g., vehicle computing system, etc.).

At (614), the operations 600 can include the autonomous vehicle computing system (e.g., tamper detection computing device located within a protected enclosure on-board the autonomous vehicle, etc.) generating a response to the status query and signing the response using the stored first private key. The computing device can generate a response (e.g., including the received token and timestamp, etc.) and sign the response with its private key (e.g., the first private key registered with the remote computing system).

At (616), the operations 600 can include the autonomous vehicle (e.g., the vehicle computing system, etc.) providing the signed status query response to the remote computing system. At (618), the operations 600 can include the remote computing system obtaining the signed status query response from the autonomous vehicle.

At (620), the operations 600 can include the remote computing system validating the received signed response using the stored first public key (e.g., received from the autonomous vehicle during vehicle registration). The remote computing system can then use the public key associated with the autonomous vehicle that it stored as part of a provisioning process to verify the received response. If the tamper detection device has not detected an access/tamper condition since the provisioning process was completed, the remote computing system can determine that the response is valid (e.g., that the response was signed with a private key associated with the registered public key), thereby indicating that the protected enclosure associated with the autonomous vehicle has not been accessed and/or tampered with. In some implementations, upon validating the signed response, the remote computing system may determine that no tamper/access activity has been indicated and wait to initiate a next status query iteration.

At (622), the operations 600 can include the autonomous vehicle computing system (e.g., tamper detection computing device located within a protected enclosure on-board the autonomous vehicle, etc.) identifying that a reset event has occurred with regard to the protected enclosure on-board the autonomous vehicle (e.g., tampering with enclosure, fault at tamper detection computing device, etc.). For example, the computing device can receive signal(s) from one or more sensors, switches, etc. associated with the enclosure and/or the tamper detection device indicative of a tamper and/or access condition (e.g., opening of enclosure, loos of power to device, etc.) associated with the enclosure and/or the tamper detection device.

At (624), the operations 600 can include the autonomous vehicle computing system (e.g., tamper detection computing device) can discard the first key pair that is currently stored. For example, upon receiving signal(s) indicative of a tamper/access condition, the computing device can discard the currently stored encryption key pair (e.g., first encryption key pair), such as be overwriting the memory location where the encryption key pair has been stored. In some implementations, once an encryption key pair has been discarded, the key pair cannot be recovered.

At (626), the operations 600 can include the autonomous vehicle computing system (e.g., tamper detection computing device) generating a second encryption key pair (e.g., second private key and second public key) and storing the second encryption key pair (e.g., via an accessible memory of the tamper detection computing device). The autonomous vehicle computing system (e.g., tamper detection computing device) can then use this second private key when signing a response to a received status query.

At (628), the operations 600 can include the remote computing system generating, during service operation of the autonomous vehicle, a status query to facilitate determining the status of a protected enclosure/area onboard the autonomous vehicle and providing the status query to the autonomous vehicle (e.g., the vehicle computing system, etc.).

At (630), the operations 600 can include the autonomous vehicle obtaining the status query from the remote computing system.

At (632), the operations 600 can include the autonomous vehicle computing system (e.g., tamper detection computing device located within a protected enclosure on-board the autonomous vehicle, etc.) generating a response to the status query and signing the response using the stored second private key.

At (634), the operations 600 can include the autonomous vehicle (e.g., the vehicle computing system, etc.) providing the signed status query response to the remote computing system.

At (636), the operations 600 can include the remote computing system obtaining the signed status query response from the autonomous vehicle.

At (638), the operations 600 can include remote computing system validating the received signed response using the stored first public key (e.g., received from the autonomous vehicle during vehicle registration). The remote computing system can determine that the response is invalid due to the autonomous vehicle signing the response with the second private key (e.g., the remote computing system cannot decrypt the response using the stored first public key).

At (640), the operations 600 can include the remote computing system providing one or more signals to the autonomous vehicle indicative of action(s) that should be implemented at the autonomous vehicle based on the failed response validation (indicating tampering of the protected enclosure at the autonomous vehicle). Once the detection indication has been determined by the remote computing system, the remote computing system can use the signal as an input for decisions regarding one or more appropriate actions to be taken in response. For example, a remote computing system (e.g., operations computing system) can use the signal indicative of an access/tampering detection signal with other inputs, such as the vehicle operation/state prior to the detection, whether passengers are in the vehicle, the level of access/tampering, and/or the like, in determining one or more actions that should be initiated in response to the detection, such as locating another vehicle to transfer passengers, park and discontinue vehicle operations, disable access to one or more vehicle ports, and/or the like.

At (642), the operations 600 can include obtaining signal(s) from the remote computing system indicating action(s) to be taken at the autonomous vehicle (e.g., in response to the tamper detection).

At (644), the operations 600 can include initiating an action at the autonomous vehicle based on the signal(s) from the remote computing system.

FIG. 7 depicts a block diagram of an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 112 of the autonomous vehicle 102 and a remote computing system 720 (e.g., operations computing system, other computing system, etc. that is remote from the vehicle 102) that can be communicatively coupled to one another over one or more network(s) 740. The remote computing system 720 can be and/or include the operations computing system 104 and/or remote computing system 106 of FIG. 1. The remote computing system 720 can be associated with a central operations system and/or an entity associated with the vehicle 102 such as, for example, a vehicle owner, vehicle manager, fleet operator, service provider, etc. For instance, the remote computing system 720 can be or otherwise include the remote computing system 104 described herein.

The computing device(s) 701 of the vehicle computing system 112 can include processor(s) 702 and at least one memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, magnetic disks, data registers, etc., and combinations thereof.

The memory 704 can store information that can be accessed by the one or more processors 702. For instance, the memory 704 (e.g., one or more non-transitory computer-readable storage mediums, memory devices) can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 102 can store instructions 706 that when executed by the one or more processors 702 cause the one or more processors 702 (e.g., in the vehicle computing system 112) to perform operations such as any of the operations and functions of the computing device(s) 701 and/or vehicle computing system 112, any of the operations and functions for which the vehicle computing system 112 is configured, and/or any other operations and functions described herein.

The memory 704 can store data 708 that can be obtained (e.g., received, accessed, written, manipulated, created, generated, etc.) and/or stored. The data 708 can include, for instance, services data (e.g., trip data, route data, user data, etc.), sensor data, map data, perception data, prediction data, motion planning data, object states and/or state data, object motion trajectories, feedback data, fault data, log data, status data, query data, device signals, tamper/access data, encryption data, and/or other data/information as described herein. In some implementations, the computing device(s) 701 can obtain data from one or more memories that are remote from the autonomous vehicle 102.

The computing device(s) 701 can also include a communication interface 710 used to communicate with one or more other system(s) (e.g., the remote computing system 720). The communication interface 710 can include any circuits, components, software, etc. for communicating via one or more networks (e.g., network(s) 740). In some implementations, the communication interface 710 can include, for example, one or more of a communications controller, receiver, transceiver, transmitter, port, conductors, software, and/or hardware for communicating data.

The computing device(s) 701 and/or vehicle computing system 112 can also include a tamper/access detection system 712. The tamper/access detection system 712 can facilitate securely and remotely detecting that a secure or protected enclosure, computing system, and/or the like on-board an autonomous vehicle has been accessed, modified, and/or potentially tampered with (e.g., such that vehicle systems may no longer be trusted to operate in an appropriate operational domain). The tamper/access detection system 712 can generate signals that can be provided to remote computing system(s) (e.g., remote computing system 720, etc.) indicating that a tamper/access condition has occurred on-board an autonomous vehicle (e.g., tamper/access of a secure enclosure/area).

The remote computing system 720 can include one or more computing device(s) 721. The computing device(s) 721 can include one or more processors 722 and at least one memory 724. The one or more processors 722 can be any suitable processing device (e.g., a processor core, a microprocessor, an ASIC, a FPGA, a controller, a microcontroller, etc.) and can be one processor or a plurality of processors that are operatively connected. The memory 724 can include one or more tangible, non-transitory computer-readable storage media, such as RAM, ROM, EEPROM, EPROM, one or more memory devices, flash memory devices, data registers, etc., and combinations thereof.

The memory 724 can store information that can be accessed by the one or more processors 722. For instance, the memory 724 (e.g., one or more tangible, non-transitory computer-readable storage media, one or more memory devices, etc.) can include computer-readable instructions 726 that can be executed by the one or more processors 722. The instructions 726 can be software written in any suitable programming language or can be implemented in hardware. Additionally, or alternatively, the instructions 726 can be executed in logically and/or virtually separate threads on processor(s) 722.

For example, the memory 724 can store instructions 726 that when executed by the one or more processors 722 cause the one or more processors 722 to perform operations such as any of the operations and functions of the operations computing system 104, the remote computing system 106, the remote computing system 720 and/or computing device(s) 721 or for which any of these computing systems are configured, as described herein, and/or any other operations and functions described herein.

The memory 724 can store data 728 that can be obtained and/or stored. The data 728 can include, for instance, services data (e.g., trip data, route data, user data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, status data, query data, tamper/access data, encryption data, etc.), third-party entity data, inventory data, scheduling data, log data, and/or other data/information as described herein. In some implementations, the computing device(s) 721 can obtain data from one or more memories that are remote from the remote computing system 720.

The computing device(s) 721 can also include a communication interface 730 used to communicate with one or more other system(s) (e.g., the vehicle computing system 112, etc.). The communication interface 730 can include any circuits, components, software, etc. for communicating via one or more networks (e.g., network(s) 740). In some implementations, the communication interface 730 can include, for example, one or more of a communications controller, receiver, transceiver, transmitter, port, conductors, software, and/or hardware for communicating data.

The network(s) 740 can be any type of network or combination of networks that allows for communication between devices. In some embodiments, the network(s) 740 can include one or more of a local area network, wide area network, the Internet, secure network, cellular network, mesh network, peer-to-peer communication link, and/or some combination thereof, and can include any number of wired or wireless links. Communication over the network(s) 740 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors; and
   one or more memories including instructions that, when executed by the one or more processors, cause the one or more processors to perform operations, the operations comprising:
   generating, as a current key pair, a first key pair comprising a first private key and a first public key as part of a vehicle registration process;
   providing the first public key to one or more remote computing systems;
   determining whether a reset event occurred at a vehicle;
   in response to determining that the reset event occurred, discarding the first key pair as the current key pair and generating a second key pair comprising a second private key and a second public key as the current key pair;
   receiving a status query from one of the one or more remote computing systems;
   generating a response to the status query, the response being signed using either the first private key or the second private key; and
   providing the response to the one of the one or more remote computing systems.

2. The computing system of claim 1, wherein when the response is signed using the first private key, the response provides an indication to the one of the one or more remote computing systems that the reset event has not occurred at the vehicle.

3. The computing system of claim 1, wherein when the response is signed using the second private key, the response provides an indication to the one of the one or more remote computing systems that the reset event has occurred at the vehicle.

4. The computing system of claim 3, the operations further comprising receiving, from the one of the one or more remote computing systems, a signal indicative of one or more actions to be initiated at the vehicle based on the one of the one or more remote computing systems receiving the status query response signed using the second private key.

5. The computing system of claim 1, the operations further comprising:
receiving, from the one or more remote computing systems in response to providing the first public key to the one or more remote computing systems, data comprising the first public key signed with a remote certificate by the one or more remote computing systems;
storing the remote certificate; and
determining whether the current key pair is trusted by the one or more remote computing systems based on the stored remote certificate.

6. The computing system of claim 1, wherein a reset event comprises an indication of a tamper sensor being triggered at the vehicle.

7. The computing system of claim 6, wherein the tamper sensor is associated with a secure enclosure on-board the vehicle; and
wherein the current key pair is generated by one or more computing devices and stored by one or more memories comprised within the secure enclosure.

8. The computing system of claim 7, wherein the tamper sensor being triggered indicates that the secure enclosure on-board the vehicle has been physically tampered with.

9. An autonomous vehicle, comprising:
a vehicle computing system comprising:
one or more processors; and
at least one tangible, non-transitory computer readable medium that stores instructions that, when executed by the one or more processors, cause the one or more processors to perform operations, the operations comprising:
generating, as a current key pair, a first key pair comprising a first private key and a first public key as part of an autonomous vehicle registration process;
providing the first public key to one or more remote computing systems;
determining whether a reset event occurred at the autonomous vehicle;
in response to determining that the reset event occurred, discarding the first key pair as the current key pair and generating a second key pair as the current key pair, the second key pair comprising a second private key and a second public key;
receiving a status query from one of the one or more remote computing systems;
generating a response to the status query, the response being signed using either the first private key or the second private key; and
providing the response to the one of the one or more remote computing systems.

10. The autonomous vehicle of claim 9, wherein when the response is signed using the first private key, the response provides an indication to the one of the one or more remote computing systems that the reset event has not occurred at the autonomous vehicle.

11. The autonomous vehicle of claim 9, wherein when the response is signed using the second private key, the response provides an indication to the one of the one or more remote computing systems that the reset event has occurred at the autonomous vehicle.

12. The autonomous vehicle of claim 11, the operations further comprising receiving, from the one of the one or more remote computing systems, a signal indicative of one or more actions to be initiated at the autonomous vehicle, wherein the one or more actions comprise at least one of modifying an operational state of the autonomous vehicle, modifying a motion plan of the autonomous vehicle, initiating a safe stop of the autonomous vehicle.

13. The autonomous vehicle of claim 9, the operations further comprising:
receiving, from the one or more remote computing systems in response to providing the first public key to the one or more remote computing systems, data comprising the first public key signed with a remote certificate by the one or more remote computing systems;
storing the remote certificate; and
determining whether the current key pair is trusted by the one or more remote computing systems based on the stored remote certificate.

14. The autonomous vehicle of claim 9, wherein a reset event comprises an indication of a tamper sensor being triggered at the vehicle.

15. The autonomous vehicle of claim 14, wherein the tamper sensor is associated with a secure enclosure on-board the autonomous vehicle; and
wherein the tamper sensor being triggered indicates that the secure enclosure on-board the vehicle has been physically tampered with.

16. A computer-implemented method, the method comprising:
generating, by a computing system comprising one or more computing devices, a first key pair comprising a first private key and a first public key to be stored as a current key pair as part of a vehicle registration process;
providing, by the computing system, the first public key to one or more remote computing systems;
determining, by the computing system, whether a reset event occurred at a vehicle;
in response to determining that the reset event occurred, discarding the first key pair as the current key pair and generating, by the computing system, a second key pair comprising a second private key and a second public key as the current key pair;
receiving, by the computing system, a status query from one of the one or more remote computing systems;
generating, by the computing system, a response to the status query, the response being signed using either the first private key or the second private key; and
providing, by the computing system, the response to the one of the one or more remote computing systems.

17. The computer-implemented method of claim 16, wherein when the response is signed using the first private key, the response provides an indication to the one of the one or more remote computing systems that the reset event has not occurred at the vehicle; and
wherein when the response is signed using the second private key, the response provides an indication to the one of the one or more remote computing systems that the reset event has occurred at the vehicle.

18. The computer-implemented method of claim 17, the method further comprising receiving, by the computing system from the one of the one or more remote computing systems, a signal indicative of one or more actions to be initiated by the vehicle based on the one or more remote computing systems receiving the status query response signed using the second private key.

19. The computer-implemented method of claim 16, the method further comprising:
- receiving, by the computing system in response to providing the first public key to the one or more remote computing systems, data comprising the first public key signed with a remote certificate by the one or more remote computing systems;
- storing, by the computing system, the remote certificate; and
- determining, by the computing system, whether the current key pair is trusted by the one or more remote computing systems based on the stored remote certificate.

20. The computer-implemented method of claim 16, wherein a reset event comprises an indication of a tamper sensor being triggered at the vehicle.

* * * * *